US00RE37442B1

(19) United States
(12) Reissued Patent
Spear et al.

(10) Patent Number: US RE37,442 E
(45) Date of Reissued Patent: Nov. 13, 2001

(54) PORTABLE HOSE CART ASSEMBLY

(75) Inventors: Kenneth J. Spear, Vienna, WV (US); Steven F. Brooker, Marietta, OH (US); Rudy F. Planthaber, Mineral Wells; Eric D. Bennett, Parkersburg, both of WV (US)

(73) Assignee: Ames True Temper, Inc., Parkersburg, WV (US)

(21) Appl. No.: 09/465,172

(22) Filed: Dec. 16, 1999

Related U.S. Patent Documents

Reissue of:
(64) Patent No.: 5,794,649
Issued: Aug. 18, 1998
Appl. No.: 08/724,668
Filed: Oct. 1, 1996

(51) Int. Cl.[7] ..... B65H 75/34
(52) U.S. Cl. ..... 137/355.27; 137/580
(58) Field of Search ..... 137/355.27, 580

(56) References Cited

U.S. PATENT DOCUMENTS

| | | | |
|---|---|---|---|
| Re. 32,510 | 9/1987 | Tisbo et al. | 137/355.27 |
| D. 381,375 | 7/1997 | Spear et al. . | |
| D. 392,080 | 3/1998 | Tisbo et al. . | |
| 2,488,425 | 11/1949 | Morrone . | |
| 2,512,756 | 6/1950 | Wasserman . | |
| 4,137,939 | 2/1979 | Chow | 137/355.27 |
| 4,512,361 | 4/1985 | Tisbo et al. | 137/355.27 |
| 4,777,976 | 10/1988 | Johnston et al. | 137/355.27 |
| 5,007,598 | 4/1991 | Spear et al. | 137/355.27 |
| 5,046,520 | 9/1991 | Sanchez, Jr. et al. | 137/355.27 |
| 5,056,553 | 10/1991 | Whitehead | 137/355.27 |
| 5,381,981 | 1/1995 | Nelson | 137/355.27 |
| 5,425,391 | 6/1995 | Tisbo et al. | 137/355.27 |
| 5,657,789 | 8/1997 | Tisbo et al. | 137/355.27 |
| 5,704,384 | 1/1998 | Tisbo et al. | 137/355.27 |

OTHER PUBLICATIONS

"Ames Full Line Catalog," Home/Farm/Industry Catalog No. 950525, 1995.

*Primary Examiner*—A. Michael Chambers
(74) *Attorney, Agent, or Firm*—Pillsbury Winthrop LLP

(57) ABSTRACT

The objective of the present invention is to provide a portable hose cart assembly capable of stacking, yet having circular hose reel end flanges. The portable hose cart assembly utilizes a supporting frame structure constructed and arranged to be nested on top of a similar supporting frame structure. The supporting frame structure is also constructed and arranged such that a similar supporting frame structure can be nested on top of the supporting frame structure. A hose reel structure for receiving and supporting a length of hose is rotatably mounted within the supporting frame structure. Circular end flanges are fixed to the ends of the hose reel structure. A handle structure movable between a stacking position and an operating position is connected to the supporting frame structure. The handle structure has a locking mechanism such that the handle structure may be secured in the operating position. Wheel structures are connected to the supporting frame structure to allow for manual movement of the portable hose cart assembly. These structures are designed and assembled in a manner to allow a similar portable hose cart assembly to be stacked on top of the portable hose cart assembly in a nesting arrangement such that the circular end flanges of each portable hose cart assembly are closely spaced. Upwardly facing supporting surfaces of the portable hose cart assembly support the downwardly facing stacking surfaces of the similar portable hose cart assembly stacked in a nesting arrangement on top of the portable hose cart assembly. A portable hose cart assembly with a tray structure located below the end flanges of the hose reel structure is further provided. The tray structure has a bottom wall with perforations and a peripheral wall extending upward from the bottom wall.

22 Claims, 9 Drawing Sheets

PORTABLE HOSE CART ASSEMBLY

Matter enclosed in heavy brackets [ ] appears in the original patent but forms no part of this reissue specification; matter printed in italics indicates the additions made by reissue.

The present invention relates to hose carts and more particularly to hose carts of the portable type.

Portable hose carts have been commercially available for many years. Early portable hose cart designs utilized hose reels for receiving a coiled length of hose mounted within metal tubular frames. The metal frames were supported on wheels allowing them to be moved manually. Examples of these early portable hose carts are disclosed in U.S. Pat. Nos. 4,137,939, 2,512,756, and 2,488,425.

In recent years, frames and components made of molded plastic have been utilized to replace the metal frames and components of the earlier portable hose carts. Most plastic frames must be packaged unassembled and sent to retailers. Thus, the responsibility for assembly falls on either the retailer or the consumer. Examples of portable hose carts constructed of molded plastic are disclosed in U.S. Pat. Nos. 5,381,981, 5,056,553, and 5,007,598.

It is also known in the prior art to construct stackable portable hose carts that can be shipped and merchandised fully assembled. The sale of fully assembled portable hose cart obviates some problems associated with unassembled hose carts. For example, stackable hose carts reduce the inventory space occupied by an assembled hose cart. Also, consumers do not have to assemble a hose cart that is merchandised fully assembled.

One prior art reference, U.S. Pat. No. 5,425,391, discloses a hose cart that is capable of being shipped fully assembled. This reference teaches the use of a folding handle and a hose reel with oblong end flanges to permit stacking of multiple units. The irregular shape of a hose reel with oblong end flanges, however, makes it difficult to roll or unroll a length of hose. Lateral movement of the hose when unrolling it can cause the hose to extend over the shorter side of the oblong end flange. The hose can then become entangled with the higher side of the end flange as the hose reel rotates. This situation does not occur with circular end flanges because the edge of the flange is the same distance from the hose reel surface at any given point. The oblong end flanges, however, are vital to the '391 hose cart because the cart will not stack upon other such hose carts without the oblong end flanges.

The objective of the present invention is to provide a portable hose cart capable of stacking and nesting, yet having circular hose reel end flanges, thus obviating the problems of the prior art.

The present invention is a portable hose cart assembly comprising a supporting frame structure and a hose reel structure. The supporting frame structure is constructed and arranged to be nested on top of a similar supporting frame structure. The supporting frame structure is also constructed and arranged such that a similar supporting frame structure can nest on top of the supporting frame structure.

The hose reel structure has a surface for receiving a length of hose thereon. Circular end flanges are fixed to the end of the hose reel structure. The circular end flanges have a larger diameter than the hose reel structure surface. The hose reel structure is rotatably mounted within the supporting frame structure such that a portion of the circular end flanges are above the highest point of the supporting frame structure.

The portable hose cart assembly also comprises a handle structure and wheel structures. The handle structure connects to the supporting frame structure such that the handle structure can be moved from a stacking position, extending generally downwardly coextensive with respect to the supporting frame structure, to an operating position, extending upwardly from the supporting frame structure so that a hand grip portion is disposed above the circular end flanges. Also, the handle structure has a locking mechanism constructed and arranged to secure the handle structure in the operating position. The wheel structures connect to the supporting frame structure and are constructed and arranged to enable the portable hose cart assembly to be rolled manually by exerting force on the hand grip portion of the handle structure in the operating position.

These structures are constructed and arranged to allow a similar portable hose cart assembly to be stacked in a nesting arrangement on top of the portable hose cart assembly with the handle structure in the stacking position and the supporting frame structure of the portable hose cart assembly in a nesting relation with the supporting frame structure of the similar hose cart assembly. When the portable hose cart assemblies are stacked, the circular end flanges of the portable cart assembly are closely spaced below the circular end flanges of the similar portable hose cart assembly.

These structures provide upwardly facing supporting surfaces constructed and arranged to support a similar portable hose cart assembly stacked in a nesting arrangement on top of the portable hose cart assembly. In addition, these structures also provide downwardly facing stacking surfaces. The downwardly facing stacking surfaces are constructed and arranged to engage the supporting surfaces of a similar portable hose cart assembly when the portable hose cart assembly is stacked on top of the similar portable hose cart assembly with the handle thereof in a stacking position. Thus, the objective of providing a portable hose cart assembly capable of stacking and nesting, yet having circular hose reel end flanges, has been achieved.

Many of the patents relating to hose carts demonstrate the desirability of providing a tray structure on the cart to carry items related to gardening and lawn care including, but not limited to, such items as gloves, hose nozzles, weed killer, pesticide, and tools for digging. Two such prior art patents are U.S. Pat. Nos. 5,046,520 and 4,777,976. The '520 patent discloses a tray structure pivotally mounted within the handle. A tray structure located above the hose reel with a pivoting lid is taught in the '976 patent.

The carts disclosed in these patents are incapable of being stacked and all of the stackable carts heretofor proposed have not provided tray structures. Surprisingly, applicant has found that it is possible to incorporate a sizable tray structure on a stackable cart by positioning the tray structure in the lower portion of the hose cart. Applicant has also found that such placement presents advantages over the placement of the tray structure in the upper portion of the hose cart.

Placing a substantial amount of weight in the upper portion of the hose cart decreases the stability of the hose cart by raising its center of gravity. Because of this, tray structures located in the upper portion of the hose cart are unable to bear much weight. Another problem is that tray structures located above the hose reel tend to interfere with access to the hose and with the rolling and unrolling of the hose. Also, because the tray structure taught in the '520 patent is mounted on the handle, the dimensions of the tray structure are limited by the size and strength of the handle. Consequently, while the tray structure mounting of the present invention is shown as being preferably provided in a stackable hose cart, in its broadest aspect, the invention contemplates the placement of the tray structure in non-stackable hose carts as well.

Accordingly, it is a further object of the present invention to provide a cart having a tray structure which achieves the advantages indicated above. In accordance with the principles of the present invention, this objective is achieved by providing a portable hose cart assembly comprising a handle and frame structure and a hose reel structure. The hose reel structure has a surface for receiving a length of hose thereon. End flanges are fixed to the ends of the hose reel. Wheel structures connect to the handle and frame structure and are constructed and arranged to enable the portable hose cart assembly to be rolled manually. The present invention also has a tray structure located lower than the end flanges. The tray structure has a bottom wall with perforations thereon and a peripheral wall extending upwardly from the bottom wall. This tray structure is constructed and arranged to accommodate the carriage of items related to lawn care and gardening including, but not limited to, such items as gloves, hose nozzles, weed killer, pesticides, and tools for digging.

Thus, the objective of providing a portable hose cart assembly with a tray structure in the lower portion of the hose cart has been achieved. The principles of the present invention relating to the tray structure are applicable to portable hose carts and are not restricted to hose carts of the stackable and nestable type. Thus, the principles of the present invention may be applied to portable hose carts of the non-stackable variety, also.

DETAILED DESCRIPTION OF THE PRESENTLY PREFERRED EMBODIMENT

Figure 1:
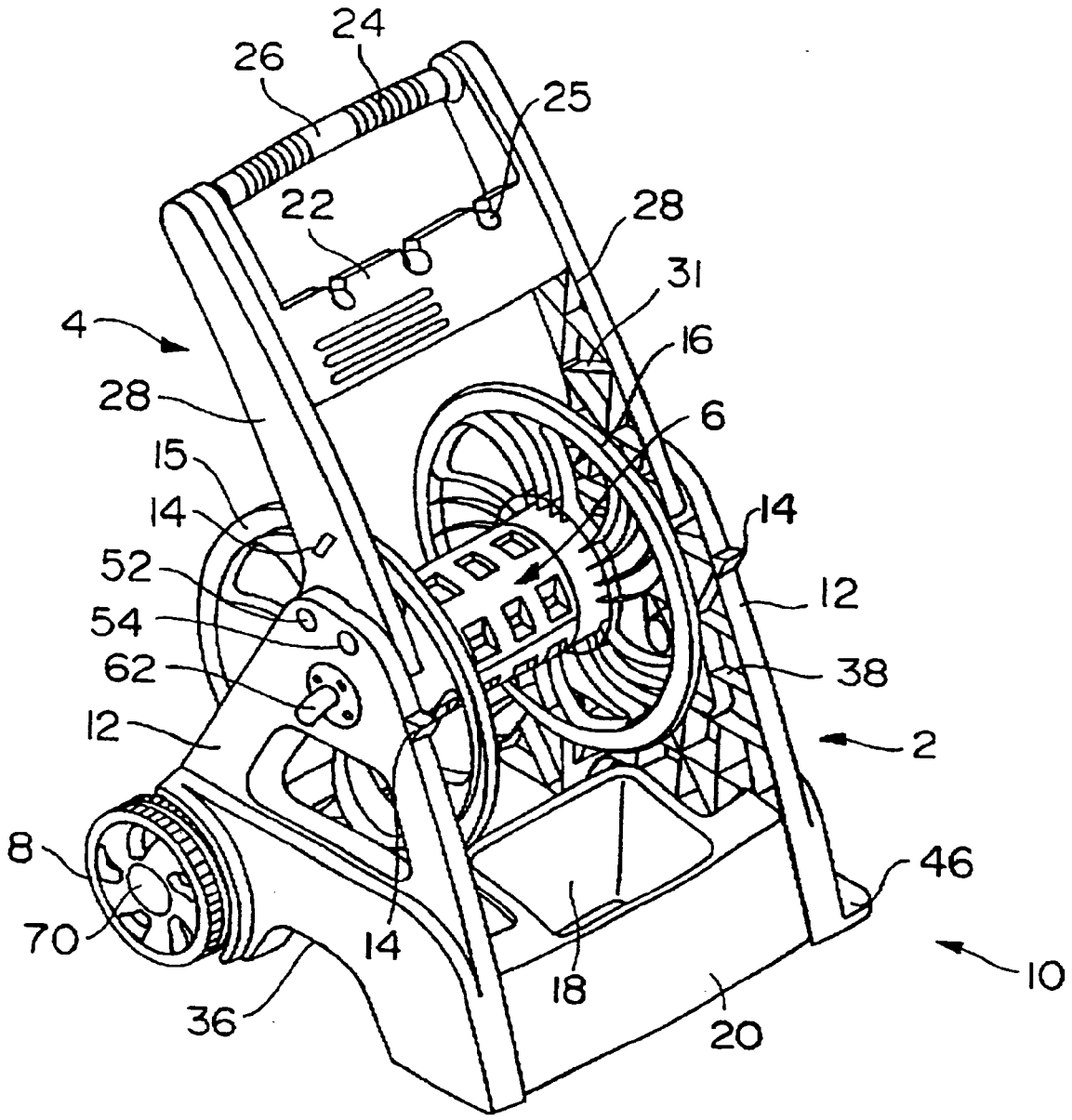
FIG. 1 is a perspective view of the portable hose cart.
Figure 2:
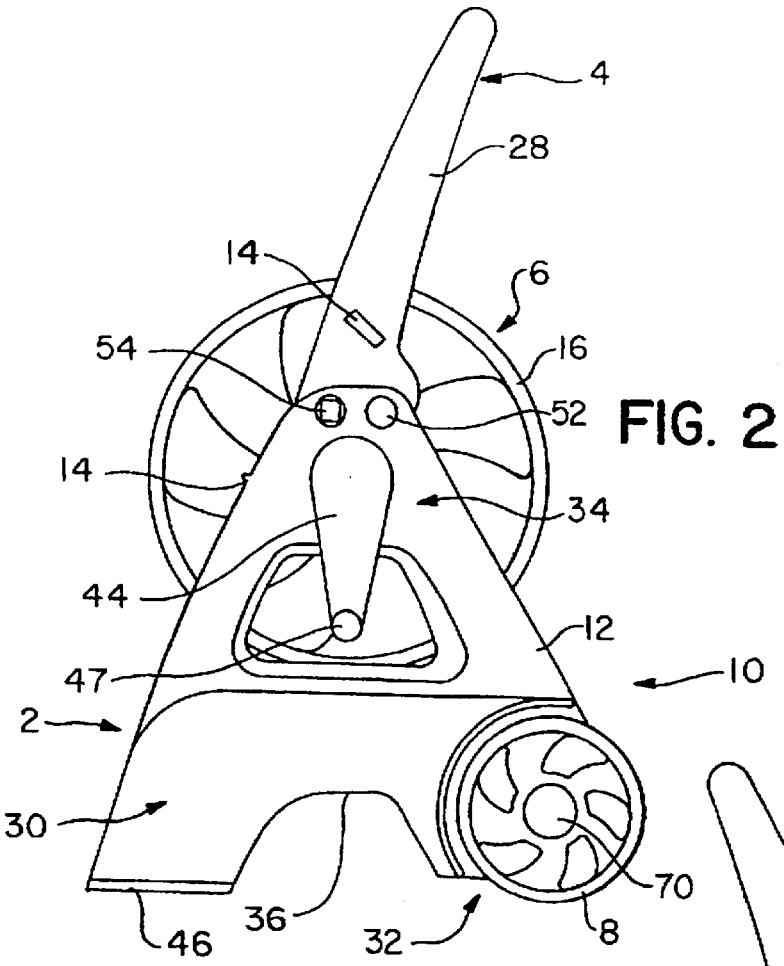
FIG. 2 is side view of the portable hose cart from the side with the hand crank.
Figure 3:
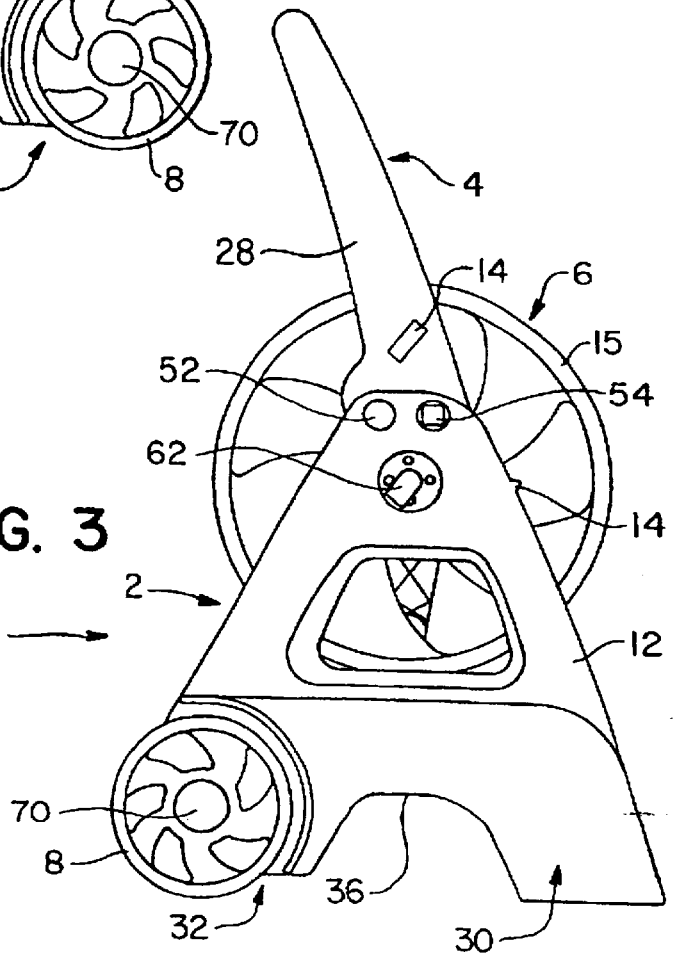
FIG. 3 is a side view of the portable hose cart from the side with the water inlet pipe.
Figure 4:
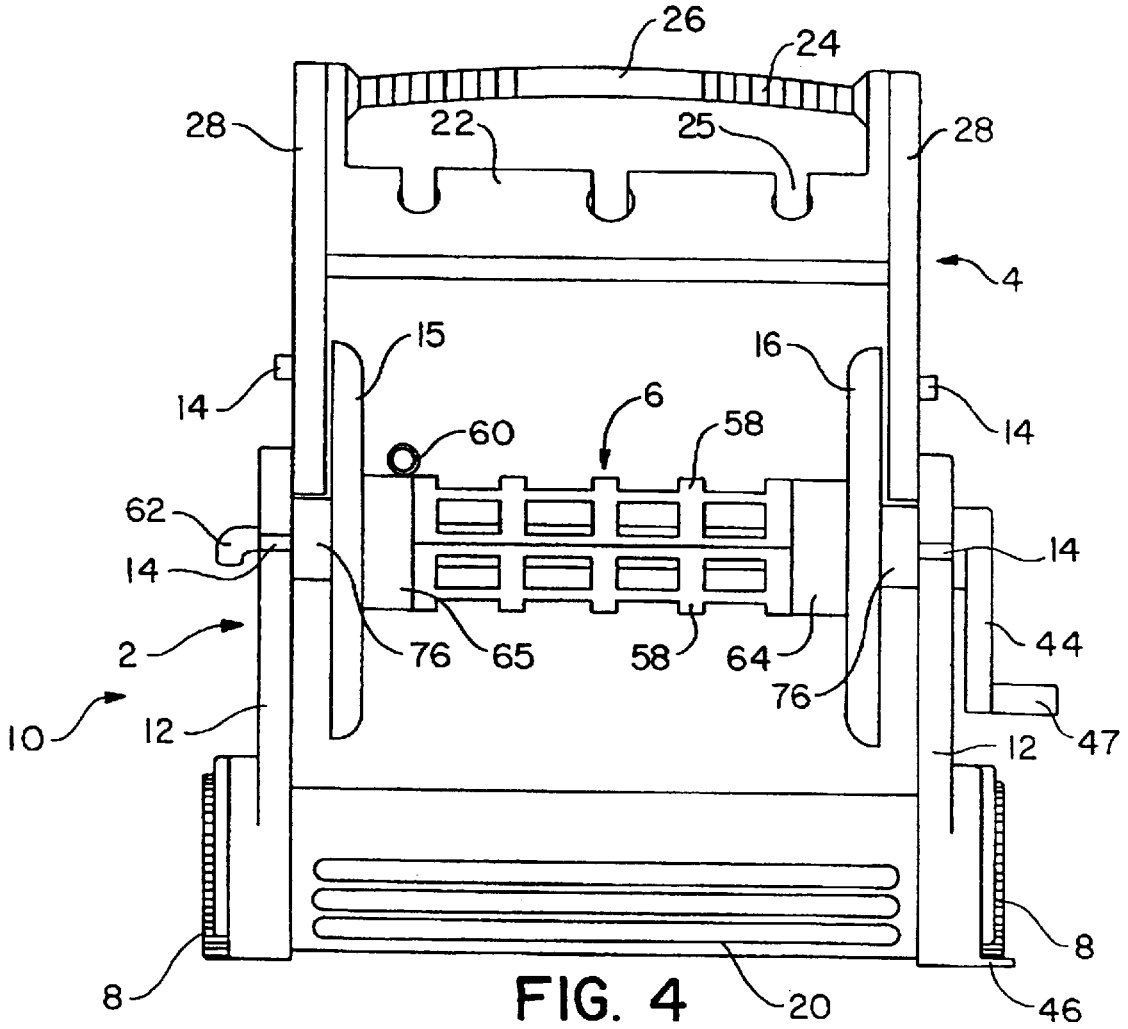
FIG. 4 is a front view of the portable hose cart.
Figure 5:
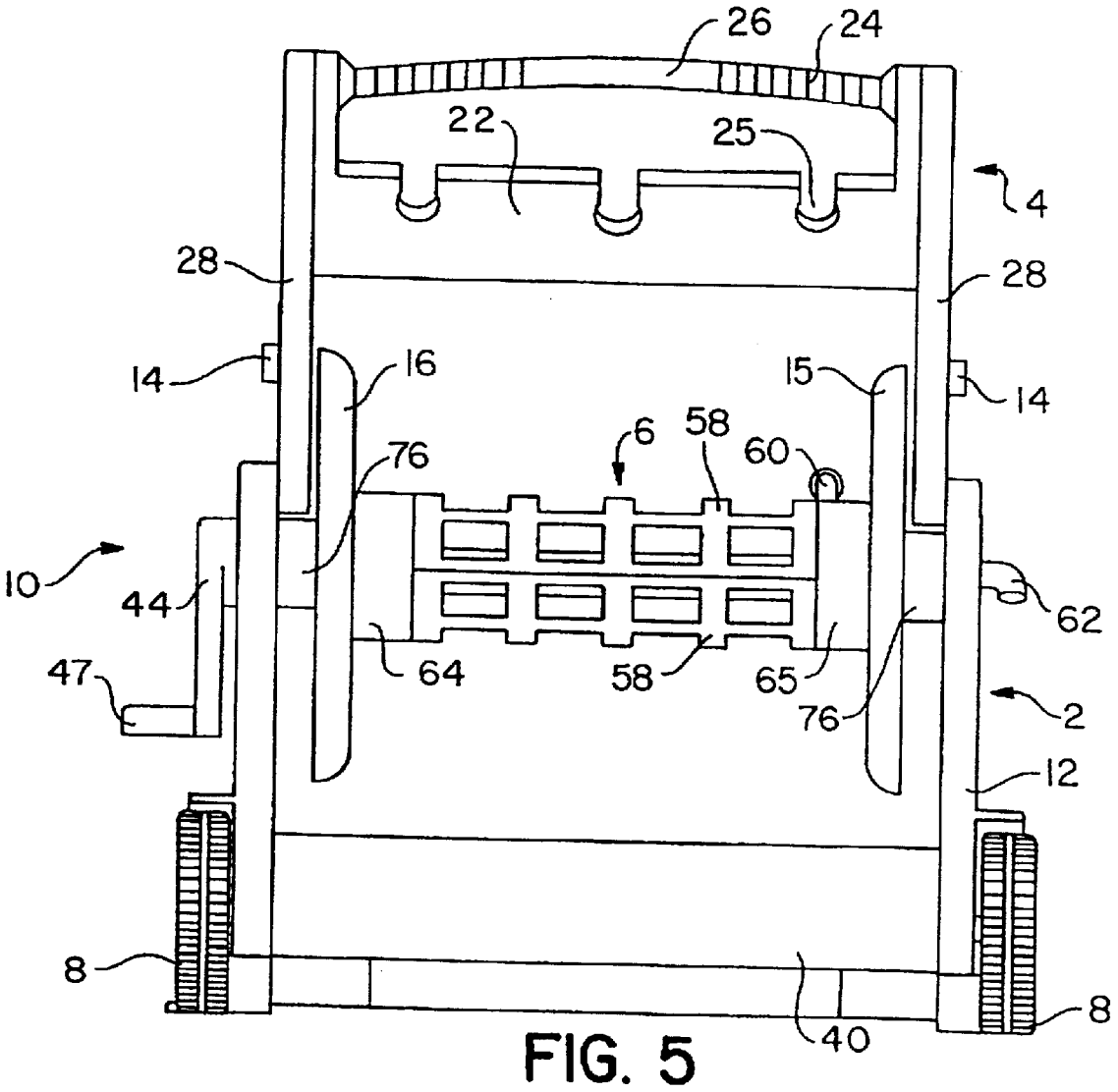
FIG. 5 is a rear view of the portable hose cart.
Figure 6:
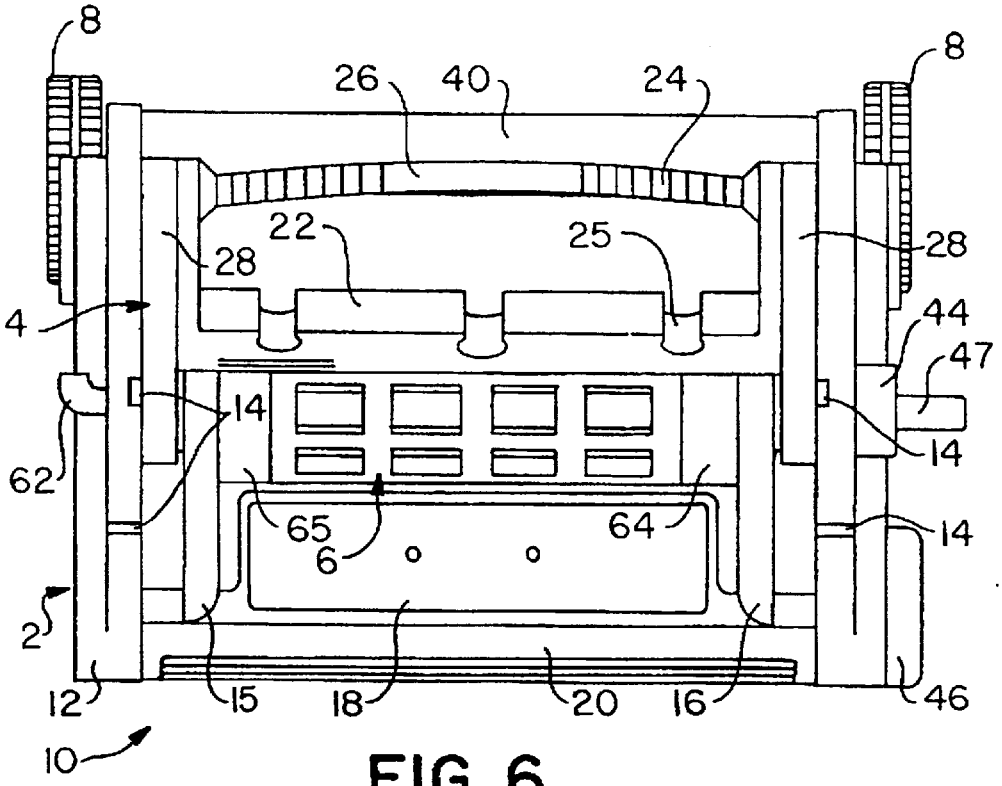
FIG. 6 is a top view of the portable hose cart.

Referring more particularly to the drawings, the preferred embodiment of the portable hose cart assembly 10 is shown in FIGS. 1–11. The major components of the portable hose cart assembly 10 include a supporting frame structure 2, a hose reel structure 6 rotatably mounted within the supporting frame structure 2, a foldable handle structure 4, wheel structures 8 allowing the portable hose cart assembly 10 to be rolled, upwardly facing supporting surfaces 14, and downwardly facing stacking surfaces 42.

The supporting frame structure 2 includes a pair of molded plastic side frames 12 shaped in a generally triangular configuration. Each side frame 12 is constructed from a single mold. The triangular shape gives the side frames 12 first 30, second 32, and third corner structures 34. The side frames 12 are generally mirror images with respect to each other.

Figure 8:
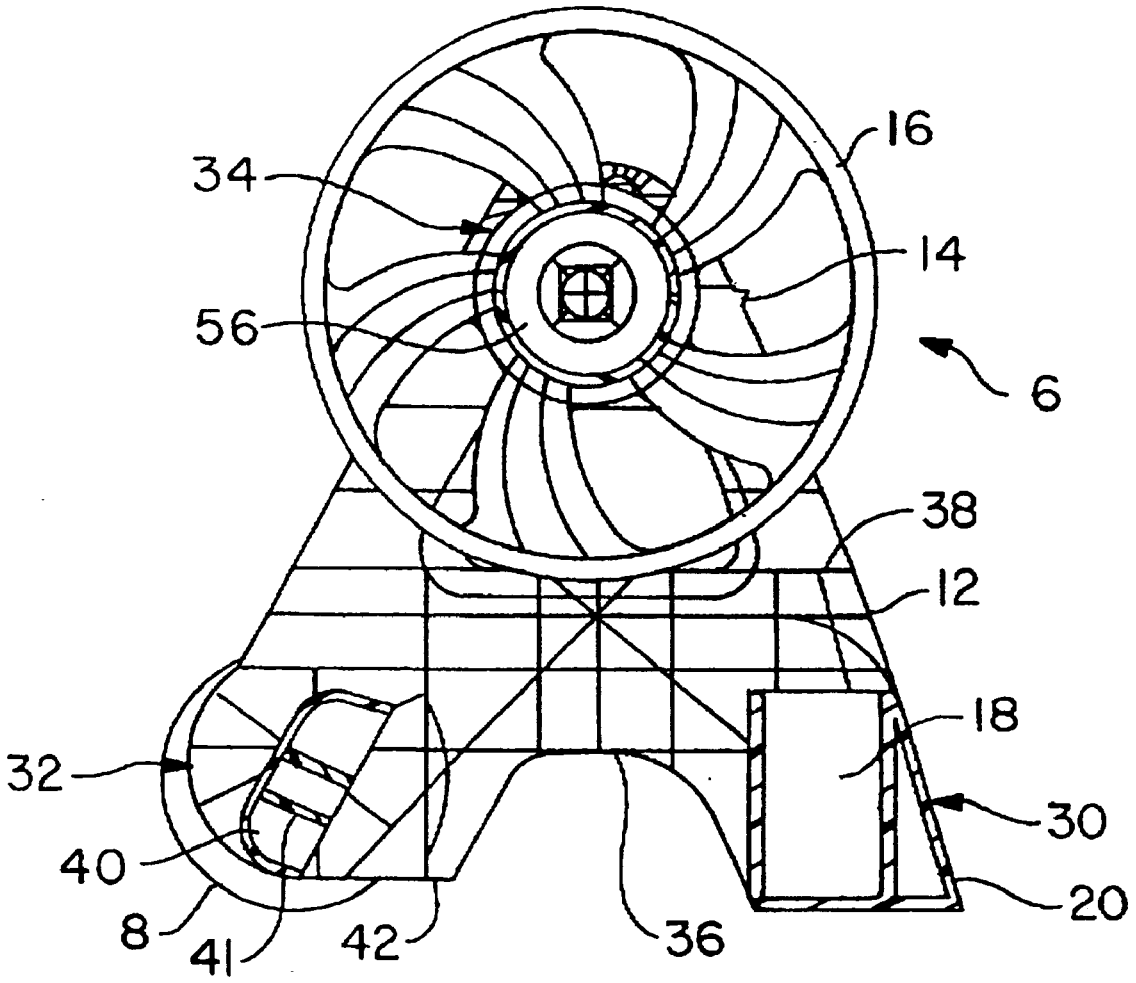
FIG. 8 is a cross-sectional view of FIG. 3 without the handle.
Figure 10:
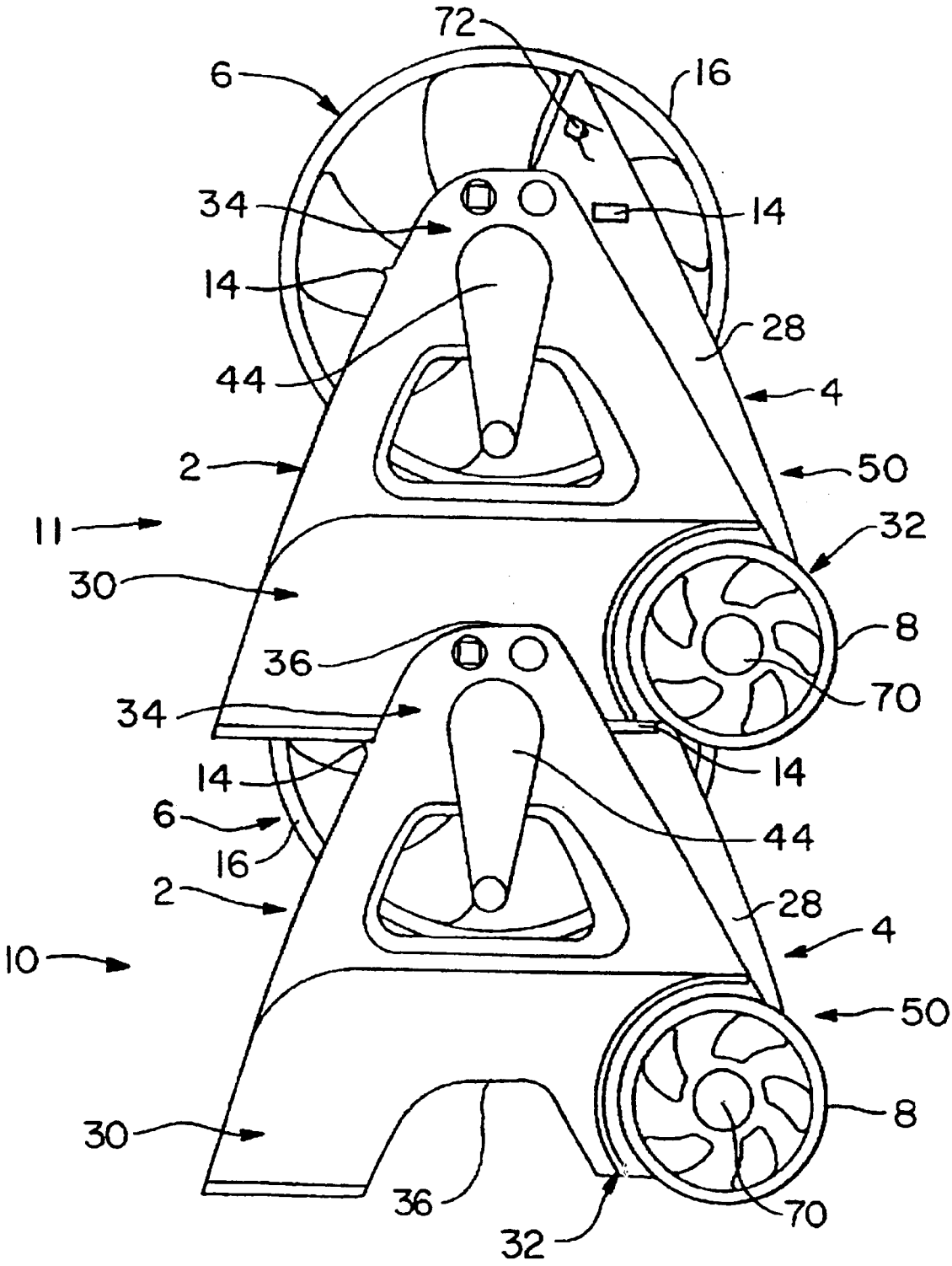
FIG. 10 depicts two portable hose carts with the handles in the stacking positions wherein one hose cart is stacked upon the other.

Each side frame 12 includes a frame portion extending forwardly and downwardly from the third corner structure 34 to the first corner structure 30. A frame portion also extends rearwardly and downwardly from the third corner structure 34 to the second corner structure 32. A frame portion extending forwardly from the second corner structure 32 to the first corner structure 30 has an upward recess 36 in the center. Each recess 36 is formed to nest upon the third corner structure 34 of a similar side frame when stacked in a nesting arrangement on top of a similar portable hose cart assembly as shown in FIG. 10. Each of the side frame portions is of a generally channel-shaped configuration having strengthening ribs 38 in the interior as shown in FIG. 8. The channel-shaped configurations of the two side frames 12 open toward one another.

The first corner structure 30 of each side frame 12 has a socket structure 17 opening in a direction towards the corresponding socket structure on the other side frame 12. A socket structure 19 opening in a direction towards the corresponding socket structure on the other side frame 12 is also found on the second corner structure 32 of each side frame. The socket structures 17, 19 on the first and second corner structures 30, 32 are designed to receive and fit snugly the closed end portions 51, 53 of the transverse frame members 20, 40. The specific manner in which the transverse frame members 20, 40 fit snugly into the associated socket structures 17, 19 is disclosed in U.S. Pat. No. 5,007,598, which is hereby incorporated by reference into the present specification.

Figure 7:
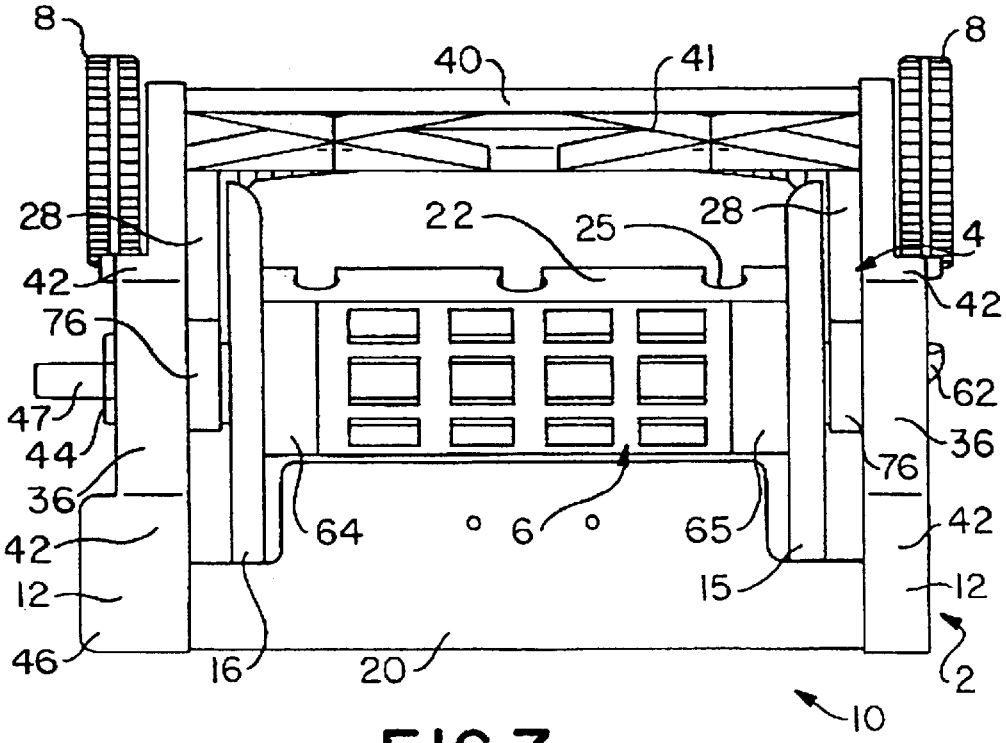
FIG. 7 is a bottom view of the portable hose cart.

Molded plastic transverse members 20, 40 connect and separate the side frames 12 in parallel relation with each other. The transverse members 20, 40 are constructed in a generally channel-shaped configuration having strengthening ribs 41 in the interior as shown in FIG. 7. A box-shaped tray structure 18 with an open top and two perforations providing drainage is molded as part of the forward transverse member 20. The end portions 51, 53 of the transverse members 20, 40 and the associated socket structures 17, 19 have interengaging structures operable in response to the transverse movement of the end portion 51, 53 into the associated socket structure 17, 19. When all the end portions 51, 53 are retained in snugly fitting relation with the associated socket structures 17, 19, with the channel-shaped configuration of the transverse members 20, 40 open generally toward each other, the side frames 12 and the transverse members 20, 40 constitute a supporting frame structure 2 having a tray structure 18 within the supporting frame structure 2 and below the circular end flanges 15, 16 of the hose reel structure 6.

Each second corner structure 32 has a shaft 68 extending outward from the side frame 12. The shaft 68 is designed for attaching wheel structures 8 to the second corner structure 32. The wheel structures 8 are made of molded plastic with a hole through the center allowing them to be rotatably mounted upon the shafts 68. The wheel structures 8 are retained on the shaft 68 by suitable end caps 70 that attach to the ends of the shafts 68. The second corner structure 30 located on the same side as the hand crank structure 44 also has a platform 46 integral with the side frame 12 extending sideways from the bottom. When using the hand crank structure 44 to turn the hose reel structure 6, the user places his foot on the platform 46 in order to keep the forward portion of the portable hose cart assembly 10 in contact with the ground.

The third corner structure 34 of each side frame 12 has a hole 74, 75 through its center. On the inside of each side frame 12 the hole 74, 75 extends through a hub 76. The hub 76 extends perpendicularly inward from the side frame 12. The hole 74, 75 and hub 76 on each third corner structure 34 are used to rotatably mount the hose reel structure 6.

Figure 11:
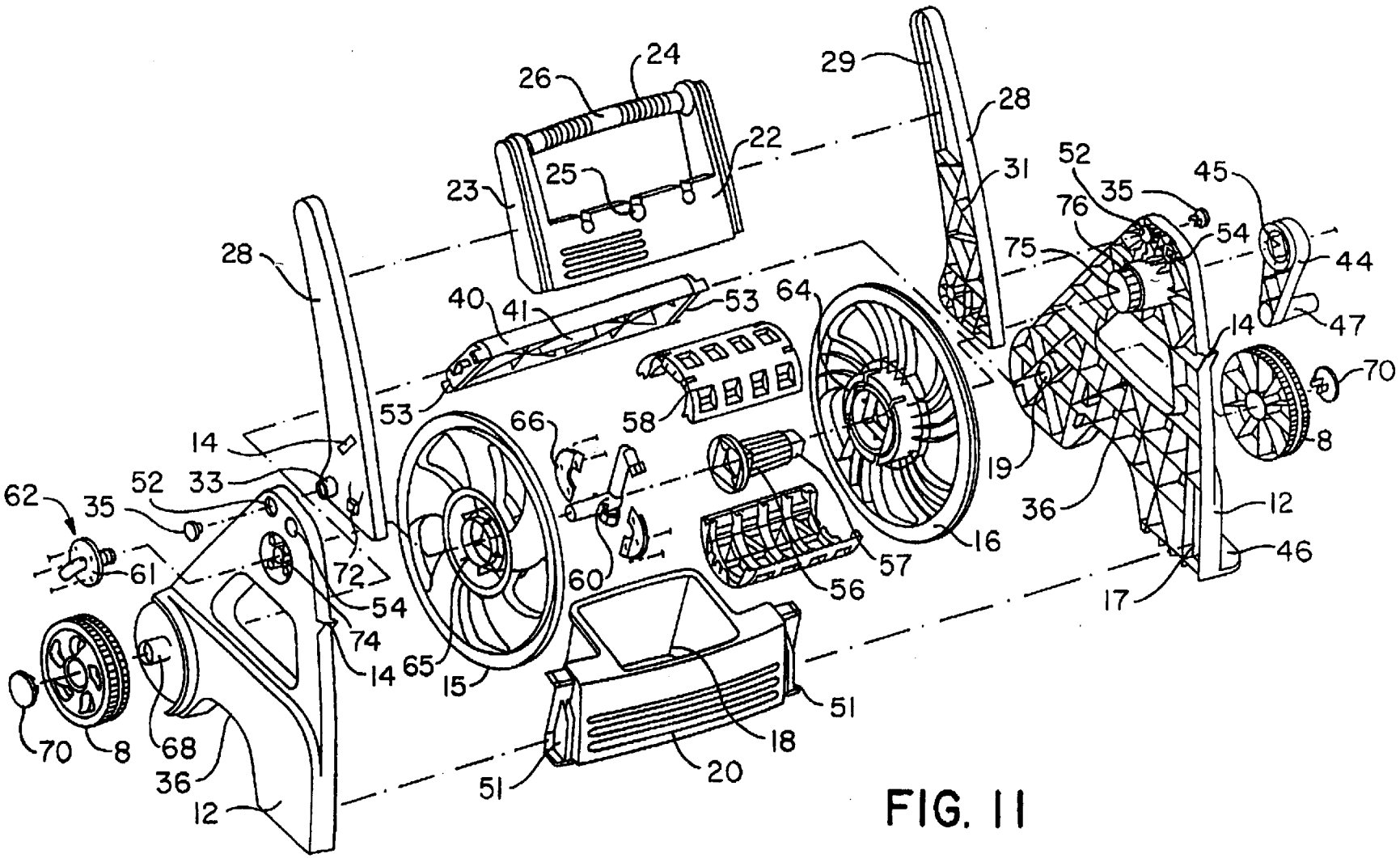
FIG. 11 is an exploded view of the portable hose cart wherein the structural components of the hose cart can be seen.

Another circular hole 52 on each third corner structure 34 is located above and rearward of the hole 74, 75 used to rotatably mount the hose reel structure 6. As shown in FIG. 11, this circular hole 52 is designed to receive a shaft 33 extending from the handle structure 4, thereby rotatably mounting the handle structure 4. Each third corner structure 34 also has one other circular hole 54 located above and forward of the hole 74, 75 used for rotatably mounting the hose reel structure 6. This hole 54 is circular throughout, but has a square opening on the inner wall of the third corner structure 34. The square opening engages with the locking mechanism 72 located on the handle structure 4 to secure the handle structure 4 in the operating position 48. The circular opening is necessary so that users can access and manually disengage the locking mechanism 72 in order to fold the handle structure 4 down to the stacking position 50.

The handle structure 4 is made of two molded plastic side legs 28 and a single molded plastic transverse member 22. The side legs 28 are mirror images of each other and constructed in a generally channel-shaped configuration having strengthening ribs 31 on the interior. Socket structures 29 are located on the ribbed surface of the side legs 28. The transverse member 22 is formed by blow molding, which gives it a hollow center area with closed end portions 23. A tubular hand grip portion 26 of the transverse member 22 extends along the top of the transverse member 22 between the ends of the two side legs 28. This hand grip portion 26, intended to be the surface engaged by the user when moving the portable hose cart assembly 10, has a pattern 24 formed in the plastic to facilitate gripping. The transverse member 22 also has notches 25 designed to hold hose ends.

The closed end portions 23 of the transverse member 22 and the associated socket structures 29 have interengaging structures operable in response to the transverse movement of the closed end portions 23 of the transverse member 22 into the associated socket structures 29. When the closed end portions 23 of the transverse member 22 are fit snugly within the side leg socket structures 29, the handle structure 4 is thereby formed.

The side legs 28 of the handle structure 4 each have a shaft 33 located near the end opposite the socket structures 29 as shown in FIG. 11. The handle structure 4 is rotatably mounted, offset to the inside of the supporting frame structure 2, by inserting each shaft 33 into the aforementioned corresponding hole 52 located on the third corner structure 34. An end cap 35 engages the end of each shaft 33 in order to secure the shaft 33 within the hole 52.

Figure 9:
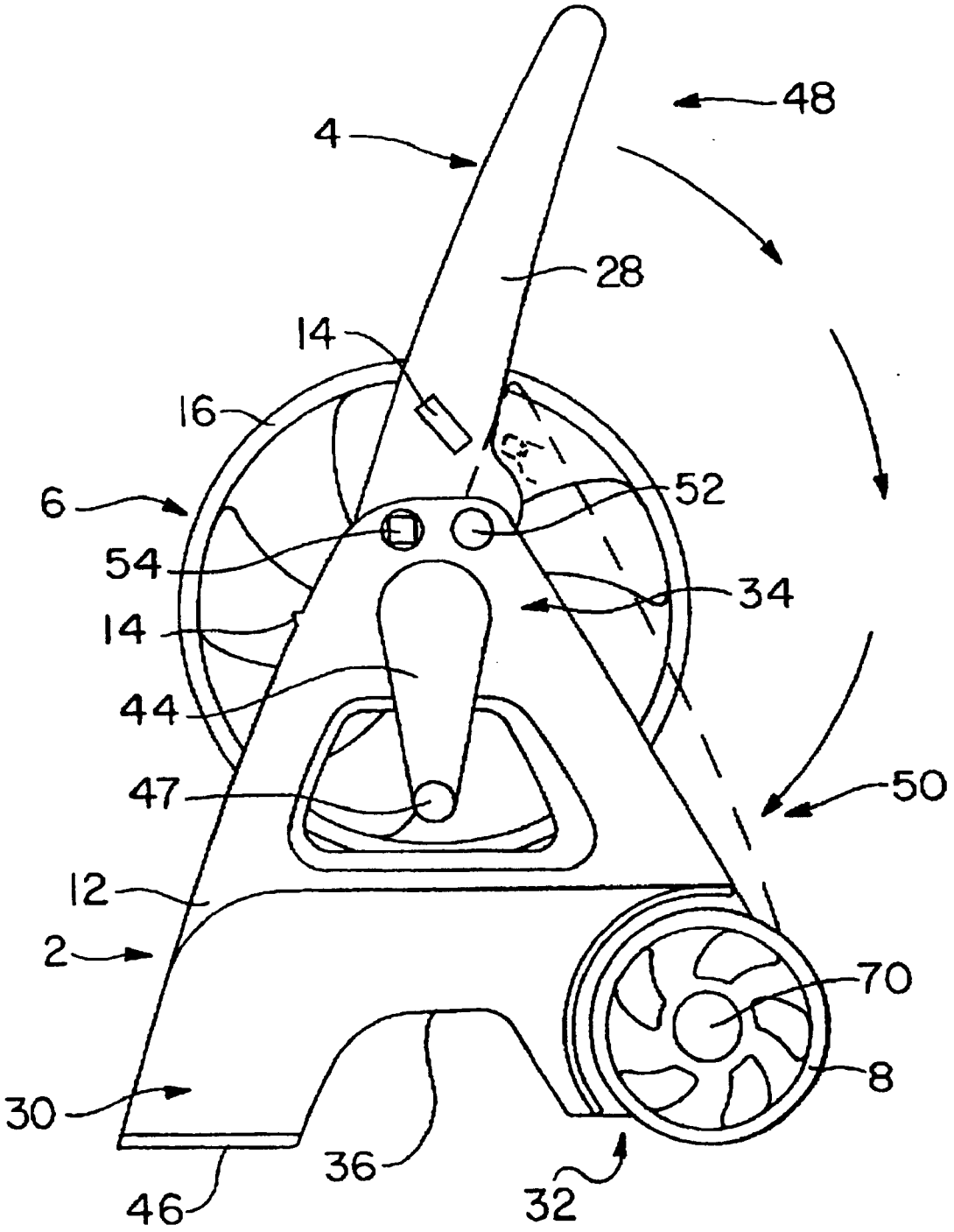
FIG. 9 is a side view from the side with the hand crank of the portable hose cart depicting the rotation of the handle.

The handle structure 4 has two positions as shown in FIG. 9. When the handle structure 4 is in the operating position 48, the hand grip portion 26 is elevated higher than the circular end flanges 15, 16. When the handle structure 4 is in the stacking position 50, the handle structure 4 is folded down such that it is coextensive with and inside the supporting frame structure 2.

A locking mechanism 72 is located on each side leg 28 directly forward of the shaft 33 when the handle structure 4 is in the operating position 48. Preferably, this locking mechanism 72 is designed as a tab, located on the side leg 28, with a generally square structure protruding outward from it. As the handle structure 4 is rotated from the folded stacking position 50 to the operating position 48, the locking mechanism 72 is folded backwards into the side leg 28 as the generally square protrusion touches the side frame 12. The locking mechanism 72 stays in this position until the handle structure 4 has been rotated such that the square protrusion has reached the hole 54 on the third corner structure 34 with the square opening on the inside. When the square protrusion has reached the square opening, the locking mechanism 72 unfolds into its original shape and the square protrusion fits into the square opening on the third corner structure 34. Thus, the handle structure 4 is secured in the operating position 48. The locking mechanism 72 is disengaged by pushing into the hole 54 and forcing the locking mechanism 72 out of the square opening and folding the handle structure 4 down into the stacking position 50.

A hand crank structure 44 turns the hose reel structure 6. The molded plastic hand crank structure 44 has a handle 47 and a socket structure 45. The socket structure 45 has a square shape within which the end of a rotatable shaft 56 forming a part of the hose reel structure 6 is received. A fastener fixes the hand crank structure 44 to the rotatable shaft 56.

Preferably, the hose reel structure 6 utilizes two semi-cylindrical hub sections 58, two circular end flanges 15, 16, a water outlet pipe 60, a rotatable, fluid connection between the inlet pipe 62 and the outlet pipe 60, and a rotatable shaft 56. The specific manner in which the hose reel structure is assembled is taught in U.S. Pat. No. 5,007,598.

The circular end flanges 15, 16 are made of molded plastic with a hub section 64, 65 and spokes extending outward to a circular rim. The diameter of the circular end flanges 15, 16 is great enough that when the hose reel structure 6 is rotatably mounted within the supporting frame structure 2, a portion of the circular end flanges 15, 16 is above the highest point of the supporting frame structure 2. A notch on the hub 65 section on the inlet-side end flange 15 allows the water outlet pipe 60 to be rotated fixedly with the hose reel structure 6. The inlet-side end flange 15 also has a circular opening allowing it to be rotatably mounted on a hub 76 extending inward from the side frame 12. The crank-side end flange 16 has a circular opening in the hub 64 allowing it to be rotatably mounted on a hub 76 extending inward from the side frame 12. The inside of the crank-side end flange 16 has a squared opening designed to receive the squared base of the rotatable shaft 56.

The semi-cylindrical hub sections 58 are made of molded plastic and designed to interlock with each other and form a cylindrical hub section. They are also designed to engage with the inside hub 64, 65 surfaces of the circular end flanges 15, 16 in order to form the hose reel structure 6. This cylindrical hub section is responsible for bearing the coiled length of hose. Thus, the hose reel structure 6 is designed to be capable of bearing the load of a substantial length of hose and to have a surface capable of engaging the hose as the hose reel structure 6 is rotated.

A rotatable shaft 56 of molded plastic is used to engage the circular end flange 16 and the hand crank structure 44, thereby rotating the hose reel structure 6 as the hand crank structure 44 is turned. The rotatable shaft 56 is cylindrical with a square end 57 for engaging the hand crank structure 44 and a square base for engaging the crank-side end flange 16.

The inlet-side end flange 15 is first rotatably mounted on the hub 76 extending inward from the inlet-side side frame 12. The water outlet pipe 60 is rotatably mounted by fluidly connecting it to the water inlet pipe 62 and aligning it in the notch on the inlet-side end flange 15. A two-piece gasket 66, secured by fasteners to the hub 76 extending inward from the inlet-side side frame 12, holds the outlet pipe 60 in connection with the inlet pipe 62. The gasket 66 also secures the inlet-side end flange 15 to the hub 76 extending inward from the side frame 12, but allows the inlet-side end flange 15 to rotate freely.

The two semi-cylindrical hub sections 58 are joined together to form a cylindrical hub section. This cylindrical hub section engages the inlet-side end flange 15 such that the center line of the cylindrical hub section is perpendicular to the end flange 15. The base of the rotatable shaft 56 is engaged with the squared opening in the crank-side end flange 16. The crank-side end flange 16, now engaged with the rotatable shaft, is joined to the end of the cylindrical hub section and rotatably mounted on the hub 76 extending inward from the crank-side side frame 12. By engaging the squared end 57 of the rotatable shaft 56 with the squared socket structure 45 of the hand crank 44 and securing it thereto with a fastener, the hose reel structure 6 is rotatably mounted within the supporting frame structure 2 with a portion of the circular end flanges 15, 16 above the highest point of the supporting frame structure 2.

Water flows from a water source through the inlet 62 and outlet pipes 60. The inlet pipe 62 is formed of molded plastic and has a ninety-degree bend near one end and a flange 61 near the bend. The end opposite the bend and flange 61 has ribs allowing it to create a seal when inserted into the outlet pipe 60. The inlet pipe 62 fits in the hole 74 in the third corner structure 34 of the inlet-side side frame 12 and extends into the hub 76 on which the hose reel structure 6 is rotatably mounted. Fasteners attaching the flange 61 to the inlet-side side frame 12 secure the inlet pipe 62 in a fixed position. A flexible hose can be secured by a clamp to the end of the inlet pipe 62 with the ninety degree bend. This hose can then be connected to a water supply.

The outlet pipe 60 is mounted in the notch on the inlet-side end flange 15. One end is rotatably and fluidly connected to the inlet pipe 62 by inserting the ribbed end of the inlet pipe 62 into the receiving end of the outlet pipe 60. A hose can be connected to the male connection found on the end of the outlet pipe 60. A ninety degree bend in the outlet pipe 60 allows the receiving end of the outlet pipe 60 to be fluidly and rotatably connected with the inlet pipe 62 while the end with the male connection extends radially from the surface of the hose reel structure 6. This arrangement allows the outlet pipe 60 to rotate fixedly with the hose reel structure surface. The outlet pipe 60 also bends near the end with the male connector to facilitate connection with a hose.

In the presently preferred embodiment of the invention, upwardly facing supporting surfaces 14 are located on the forward edge of each side frame 12 and on the outside of the handle leg 28. The location of the supporting surfaces 14 on the handle legs 28 is such that the supporting surfaces 14 are aligned horizontally with the supporting surfaces 14 on the side frames 12 when the handle structure 4 is folded down in the stacking position 50. The supporting surfaces 14 are ridges extending perpendicularly from the component surface and integrally formed with the component on which each is located. The ridges are aligned such that they support the weight of a similar portable hose cart assembly 11 stacked on top of the portable hose cart assembly 10 as shown in FIG. 10.

The downwardly facing stacking surfaces 42 are those surfaces on the bottom of the portable hose cart assembly that rest upon the supporting surfaces 14 of a similar portable hose cart assembly 11 when the portable hose cart assembly 10 is stacked in a nesting arrangement on top of the similar hose cart assembly. These downwardly facing stacking surfaces are best shown in FIG. 7.

To stack the portable hose cart assemblies 10, 11 the handle structure 4 is folded down to the stacking position 50. As shown in FIG. 10, a top portable hose cart assembly 11 is aligned above a bottom portable hose cart assembly 10 such that when the top portable hose cart assembly 11 is lowered, the recess 36 formed in the frame portion between the first 30 and second corner structures 32 of the top portable hose cart assembly 11 will nest upon the third corner structure 34 of the bottom portable hose cart assembly 10. When the top portable hose cart assembly 11 is stacked and the recessed portion 36 is nested on the third corner structure 34 of the bottom portable hose cart assembly 10, the upwardly facing supporting surfaces 14 on the bottom portable hose cart assembly 10 support the downwardly facing stacking surfaces 42 on the bottom of the top portable hose cart assembly 11. The circular end flanges 15, 16 of the bottom portable hose cart assembly 10 are closely spaced below the circular end flanges 15, 16 of the top portable hose cart assembly 11. Thus, the difference in height between a portable hose cart assembly 10 and two portable hose cart assemblies 10, 11 stacked together is slightly greater than the diameter of the circular end flanges 15, 16.

Thus, the object of providing a portable hose cart assembly 10 of such a design that it can be stacked in a nesting arrangement as shown in FIG. 10 and still utilize a hose reel structure 6 with circular end flanges 15, 16, has been realized. Also, the object of providing a portable hose cart assembly 10 with a tray structure 18 located below the end flanges 15, 16 of the hose reel structure 6 has been accomplished.

Any United States patent applications or patents mentioned or cited hereinabove are hereby incorporated by reference into the present specification.

It will thus be seen that the objects of this invention have been fully and effectively accomplished. It will be realized, however, that the foregoing preferred specific embodiments have been shown and described for the purpose of illustrating the functional and structural principles of this invention and is subject to change without departure from such principles. Therefore, this invention includes all modifications encompassed within the spirit and scope of the following claims.

What is claimed is:

1. A portable hose cart assembly comprising:

a supporting frame structure constructed and arranged to be nested on top of a similar supporting frame structure;

said supporting frame structure constructed and arranged such that a similar supporting frame structure nests on top of said supporting frame structure;

a hose reel structure having a surface for receiving a length of coiled hose thereon;

said hose reel structure having circular end flanges;

said circular end flanges being fixed to the ends of said hose reel structure;

said circular end flanges having a diameter larger than that of the hose reel structure surface;

said hose reel structure being rotatably mounted within said supporting frame structure such that a portion of the said circular end flanges are above the highest point of said supporting frame structure;

a handle structure connected to said supporting frame structure such that said handle structure can be moved from a stacking position extending generally downwardly coextensive with respect to said supporting frame structure *to an operating position extending upwardly from said supporting frame structure* so that a hand grip portion is disposed above said circular end flanges;

said handle structure having a locking mechanism constructed and arranged to secure said handle structure in said operating position;

wheel structures connected to said supporting frame structure constructed and arranged to enable said portable hose cart assembly to be rolled manually by exerting force on the hand grip portion of said handle structure in said operating position;

said structures being constructed and arranged to allow a similar portable hose cart assembly to be stacked on top of said portable hose cart assembly with said handle structure in said stacking position and said supporting frame structure of said portable hose cart assembly in a nesting relation with the supporting frame structure of the similar portable hose cart assembly such that said circular end flanges of said portable hose cart assembly are closely spaced below the circular end flanges of the similar portable hose cart assembly;

said structures providing upwardly facing supporting surfaces constructed and arranged to support a similar portable hose cart assembly stacked in a nesting arrangement on top of said portable hose cart assembly;

said structures providing downwardly facing stacking surfaces constructed and arranged to engage the upwardly facing supporting surfaces of a similar portable hose cart assembly when said portable hose cart assembly is stacked in a nesting arrangement on top of the similar hose cart assembly with the handle structure thereof in a stacking position;

wherein said upwardly facing supporting surfaces of said portable hose cart assembly when engaged by the downwardly facing stacking surfaces of a similar portable hose cart assembly determine that said circular end flanges of said portable hose cart assembly are closely spaced below the circular end flanges of the similar portable hose cart assembly.

2. A portable hose cart assembly as defined in claim 1 wherein said upwardly facing supporting surfaces are ridges extending from said support frame structure positioned such that the downwardly facing stacking surfaces of a similar portable hose cart assembly engage said upwardly facing supporting surfaces when the similar portable hose cart assembly is stacked on top of said portable hose cart assembly.

3. A portable hose cart assembly as defined in claim 1 wherein said supporting frame structure comprises side frame structures and transverse member structures;

said side frame structures and said transverse member structures constructed and arranged such that said transverse member structures engage with said side frame structures to form said supporting frame structure.

4. A portable hose cart assembly as defined in claim 1 wherein said structures are made of plastic.

5. A portable hose cart assembly as defined in claim 1 wherein said handle structure comprises side leg structures and a transverse member structure having a hand grip portion;

said side leg structures and transverse member structure being constructed and arranged such that said transverse member structure engages with said side leg structures to form said handle structure.

6. A portable hose cart assembly as defined in claim 1 having a water inlet pipe and a water outlet pipe;

said water outlet pipe rotating fixedly with the surface of said hose reel structure;

one end of said water outlet pipe being fluidly and rotatably connected to said water inlet pipe;

said water outlet pipe having a male connector on the end not fluidly connected to said inlet pipe;

said male connector being constructed and arranged such that a hose can be connected to said outlet pipe;

said inlet pipe having a source connector constructed and arranged such that said inlet pipe can be connected to a water source;

said source connector being located on the inlet pipe end not fluidly connected to said outlet pipe.

7. A portable hose cart assembly as defined in claim 1 having a crank handle structure;

said crank handle structure engaging said hose reel structure;

said crank handle structure constructed and arranged such that manually turning said crank handle structure rotates said hose reel structure.

8. A portable hose cart assembly as defined in claim 1 wherein said supporting frame structure includes a tray structure;

said tray structure being mounted lower than said circular end flanges;

said tray structure having a bottom wall with perforations;

said tray structure having a peripheral wall extending upwardly from said bottom wall;

said tray structure constructed and arranged to accommodate the carriage of items used in gardening and lawn care;

said tray structure constructed and arranged to allow said portable hose cart assembly to be stacked in a nesting arrangement on top of a similar portable hose cart assembly with the handle structure thereof in a stacking position such that said circular end flanges of said portable hose cart assembly are closely spaced above the circular end flanges of the similar portable hose cart assembly.

9. A portable hose cart assembly as defined in claim 8 wherein said upwardly facing supporting surfaces are ridges positioned such that the downwardly facing stacking surfaces of a similar portable hose cart assembly engage said upwardly facing supporting surfaces when the similar portable hose cart assembly is stacked on top of said portable hose cart assembly.

10. A portable hose cart assembly as defined in claim 8 wherein said supporting frame structure comprises side frame structures and transverse member structures;

said side frame structures and said transverse member structures constructed and arranged such that said transverse member structures engage with said side frame structures to form said supporting frame structure.

11. A portable hose cart assembly as defined in claim 8 wherein said structures are made of plastic.

12. A portable hose cart assembly as defined in claim 8 wherein said handle structure comprises side leg structures and a transverse member structure having a hand grip portion;

said side leg structures and transverse member structure being constructed and arranged such that said transverse member structure engages with said side leg structures to form said handle structure.

13. A portable hose cart assembly as defined in claim 8 having a water inlet pipe and a water outlet pipe;

said water outlet pipe rotating fixedly with the surface of said hose reel structure;

one end of said water outlet pipe being fluidly and rotatably connected to said water inlet pipe;

said water outlet pipe having a male connector on the end not fluidly connected to said inlet pipe;

said male connector being constructed and arranged such that a hose can be connected to said outlet pipe;

said inlet pipe having a source connector constructed and arranged such that said inlet pipe can be connected to a water source;

said source connector being located on the inlet pipe end not fluidly connected to said outlet pipe.

14. A portable hose cart assembly as defined in claim 8 having a crank handle structure;

said crank handle structure engaging said hose reel structure;

said crank handle structure constructed and arranged such that manually turning said crank handle structure rotates said hose reel structure.

15. A portable hose cart assembly as defined in claim 8 wherein said tray structure is integrally formed with a transverse member of said supporting frame structure.

[16. A portable hose cart assembly comprising:

a handle and frame structure;

a hose reel structure for receiving a length of coiled hose thereon;

said hose reel structure being rotatably mounted within said handle and frame structure;

said hose reel structure having end flanges;

wheel structures connected to said handle and frame structure constructed and arranged to enable said portable hose cart assembly to be rolled manually;

a tray structure being mounted on said handle and frame structure, said tray structure being disposed lower than said end flanges when said portable hose cart assembly is assembled and said wheel structures are engaged with the ground such that said portable hose cart assembly is in an upright position wherein said hose reel structure is disposed above said wheel structures; said tray structure having a bottom wall with perforations;

said tray structure having a peripheral wall extending upwardly from said bottom wall;

said tray structure being constructed and arranged to accommodate the carriage of items used in gardening and lawn care.]

[17. A portable hose cart assembly as defined in claim 16 wherein said tray structure being integrally formed with a transverse member of said handle and frame structure.]

[18. A portable hose cart assembly as defined in claim 16 wherein said structures are made of plastic.]

[19. A portable hose cart assembly as defined in claim 16 wherein said handle and frame structure comprises a handle structure and a frame structure;

said handle structure not being formed integrally with said frame structure;

said handle structure connected to said frame structure.]

[20. A portable hose cart assembly as defined in claim 19 wherein said frame structure comprises side frame structures and transverse member structures;

said side frame structures and said transverse member structures being constructed and arranged such that said transverse member structures engage with said side frame structures to form said frame structure.]

[21. A portable hose cart assembly as defined in claim 19 wherein said handle structure comprises side leg structures and a transverse member structure having a hand grip portion;

said side leg structures and transverse member structure being constructed and arranged such that said transverse member structure engages with said side leg structures to form said handle structure.]

[22. A portable hose cart assembly as defined in claim 19 wherein said tray structure is integrally formed with a transverse member structure.]

[23. A portable hose cart assembly as defined in claim 16 having a crank handle structure;

said crank handle structure engaging said hose reel structure;

said crank handle structure constructed and arranged such that manually turning said crank handle structure rotates said hose reel structure.]

[24. A portable hose cart assembly as defined in claim 16 having a water inlet pipe and a water outlet pipe;

said water outlet pipe rotating fixedly with the surface of said hose reel structure;

one end of said water outlet pipe being fluidly and rotatably connected to said water inlet pipe;

said water outlet pipe having a male connector on the end not fluidly connected to said inlet pipe;

said male connector being constructed and arranged such that a hose can be connected to said outlet pipe;

said inlet pipe having a source connector constructed and arranged such that said inlet pipe can be connected to a water source;

said source connector being located on the inlet pipe end not fluidly connected to said outlet pipe.]

[25. A portable hose cart assembly as defined in claim 16 wherein said handle and frame structure comprises a handle structure and a frame structure;

said frame structure being constructed and arranged to be nested with a similar frame structure;

said handle structure connected to said frame structure such that said handle structure can be moved from a stacking position extending generally downwardly coextensive with respect to said frame structure to an operating position extending upwardly from said frame structure so that a hand grip portion is disposed above said end flanges;

said handle structure having a locking mechanism constructed and arranged to secure said handle structure in said operating position;

said structures being constructed and arranged to allow a similar portable hose cart assembly to be stacked in a nesting arrangement on top of said portable hose cart assembly with said handle structure in said stacking position and said frame structure of said portable hose cart assembly and the frame structure of the similar portable hose cart in a nesting relation;

said structures providing upwardly facing support surfaces constructed and arranged to support a similar portable hose cart assembly stacked in a nesting arrangement on top of said portable hose cart assembly;

said structures providing downwardly facing stacking surfaces constructed and arranged to engage the upwardly facing supporting surfaces of a similar portable hose cart assembly when said portable hose cart assembly is stacked in a nesting arrangement on top of the similar portable hose cart assembly with the handle structure thereof in a stacking position.]

[26. A portable hose cart assembly as defined in claim 25 wherein said upwardly facing supporting surfaces are ridges positioned such that the downwardly facing stacking surfaces of a similar portable hose cart assembly engage said upwardly facing supporting surfaces when the similar portable hose cart assembly is stacked on top of said portable hose cart assembly.]

[27. A portable hose cart assembly as defined in claim 25 wherein said supporting frame structure comprises side frame structures and transverse member structures;

said side frame structures and said transverse member structures constructed and arranged such that said transverse member structures engage with said side frame structures to form said supporting frame structure.]

[28. A portable hose cart assembly as defined in claim 25 wherein said structures are made of plastic.]

[29. A portable hose cart assembly as defined in claim 25 wherein said handle structure comprises side leg structures and a transverse member structure having a hand grip portion;

said side leg structures and transverse member structure being constructed and arranged such that said transverse member structure engages with said side leg structures to form said handle structure.]

[30. A portable hose cart assembly as defined in claim 25 having a water inlet pipe and a water outlet pipe;

said water outlet pipe rotating fixedly with the surface of said hose reel structure;

one end of said water outlet pipe being fluidly and rotatably connected to said water inlet pipe;

said water outlet pipe having a male connector on the end not fluidly connected to said inlet pipe;

said male connector being constructed and arranged such that a hose can be connected to said outlet pipe;

said inlet pipe having a source connector constructed and arranged such that said inlet pipe can be connected to a water source;

said source connector being located on the inlet pipe end not fluidly connected to said outlet pipe.]

[31. A portable hose cart assembly as defined in claim 25 having a crank handle structure;

said crank handle structure engaging said hose reel structure;

said crank handle structure constructed and arranged such that manually turning said crank handle structure rotates said hose reel structure.]

[32. A portable hose cart assembly as defined in claim 25 wherein said tray structure is integrally formed with a transverse member of said frame structure.]

[33. A portable hose cart assembly as defined in claim 25 wherein said end flanges are circular;

said circular end flanges having a diameter larger than that of said hose reel structure.]

[34. A portable hose cart assembly as defined in claim 33 wherein said hose reel is rotatably mounted within said frame structure such that a portion of said circular end flanges are above the highest point of said frame structure.]

[35. A portable hose cart assembly as defined in claim 34 wherein said structures are constructed and arranged to allow a similar portable hose cart assembly to be stacked in a nesting arrangement on top of said portable hose cart assembly with said handle structure in said stacking position and said frame structure of said portable hose cart assembly and the frame structure of a similar portable hose cart assembly in a nesting relation such that said circular end flanges are closely spaced below the end flanges of the similar portable hose cart assembly.]

[36. A portable hose cart assembly as defined in claim 35 wherein said upwardly facing supporting surfaces are ridges positioned such that the downwardly facing stacking surfaces of a similar portable hose cart assembly engage said upwardly facing supporting surfaces when the similar portable hose cart assembly is stacked on top of said portable hose cart assembly.]

[37. A portable hose cart assembly as defined in claim 35 wherein said supporting frame structure comprises side frame structures and transverse member structures;

said side frame structures and said transverse member structures constructed and arranged such that said transverse member structures engage with said side frame structures to form said supporting frame structure.]

[38. A portable hose cart assembly as defined in claim 35 wherein said structures are made of plastic.]

[39. A portable hose cart assembly as defined in claim 35 wherein said handle structure comprises side leg structures and a transverse member structure having a hand grip portion;

said side leg structures and transverse member structure being constructed and arranged such that said transverse member structure engages with said side leg structures to form said handle structure.]

[40. A portable hose cart assembly as defined in claim 35 having a water inlet pipe and a water outlet pipe;

said water outlet pipe rotating fixedly with the surface of said hose reel structure;

one end of said water outlet pipe being fluidly and rotatably connected to said water inlet pipe;

said water outlet pipe having a male connector on the end not fluidly connected to said inlet pipe;

said male connector being constructed and arranged such that a hose can be connected to said outlet pipe;

said inlet pipe having a source connector constructed and arranged such that said inlet pipe can be connected to a water source;

said source connector being located on the inlet pipe end not fluidly connected to said outlet pipe.]

[41. A portable hose cart assembly as defined in claim 35 having a crank handle structure;

said crank handle structure engaging said hose reel structure;

said crank handle structure constructed and arranged such that manually turning said crank handle structure rotates said hose reel structure.]

[42. A portable hose cart assembly as defined in claim 35 wherein said tray structure is integrally formed with a transverse member of said frame structure.]

*43. The combination comprising*

*a plurality of portable hose reel assemblies,*

*each of said plurality of portable hose reel assemblies including:*

*a supporting frame structure constructed and arranged to be disposed in nested relation on a similar supporting frame structure,*

*a hose reel structure having (1) a hose engaging surface configuration shaped to receive a length of coiled hose thereon and (2) circular end flanges disposed at opposite ends of said hose engaging surface configuration and extending radially outwardly therefrom,*

*said hose reel structure being rotatably mounted within said supporting frame structure such that an upper portion of said circular end flanges are above the highest point of said supporting frame structure,*

*a handle structure connected to said supporting frame structure such that said handle structure can be moved between (1) a stacking position extending generally downwardly in generally coextensive relationship with respect to said supporting frame structure and (2) an operating position extending generally upwardly from said supporting frame structure so that a hand grip portion is disposed above said circular end flanges, and*

*a locking mechanism having structure constructed and arranged to effect securement of said handle structure in said operating position and to enable said handle structure to be manually released from such securement to allow said handle structure to be moved into said stacking position,*

*said plurality of portable hose reel assemblies having said handle structures thereof in the stacking positions thereof and being disposed in a stack wherein any pair of adjacent portable hose reel assemblies in said stack are disposed one above the other with the supporting frame structures thereof in nested relation,*

*said plurality of portable hose reel assemblies when in said stack including two portable hose reel assemblies having their circular end flanges in substantial vertical alignment,*

*each pair of adjacent portable hose reel assemblies in said stack having two spaced pairs of interengaging surfaces constructed and arranged to be positioned in stack supporting relation when said adjacent pair of portable hose reel assemblies are in said stack,*

*one pair of the two spaced pairs of the interengaging surfaces of each adjacent pair of portable hose reel assemblies in said stack being disposed in stack supporting relation so as to prevent downward movement of a forward portion of the uppermost portable hose reel assembly with respect to the lowermost portable hose reel assembly of each pair,*

*the other pair of the two spaced pairs of the interengaging surfaces of each adjacent pair of portable hose reel assemblies in said stack being disposed in stack supporting relation so as to prevent downward movement of a rearward portion of the uppermost portable hose reel assembly with respect to the lowermost portable hose reel assembly of each pair*

*said two spaced pairs of interengaging surfaces being configured and positioned to allow an unstacked portable hose reel assembly to be moved generally vertically downwardly with respect to an uppermost portable hose reel assembly of the stack to stack the supporting frame structure on the uppermost portable hose reel assembly thereof in nested relation and to position the two spaced pairs of interengaging surfaces of the two portable hose reel assemblies in said stack supporting relation.*

*44. The combination as defined in claim 43 wherein said interengaged surfaces include a pair of downwardly facing stacking surfaces which are spaced apart with respect to one another on each portable hose reel assembly and a pair of upwardly facing supporting surfaces which are spaced apart with respect to one another on each portable hose reel assembly, the pair of downwardly facing stacking surfaces of an upper portable hose reel assembly of each adjacent pair of portable hose reel assemblies in said stack being interengaged with the pair of upwardly facing surfaces of a lower portable hose reel assembly of said pair.*

*45. The combination as defined in claim 44 wherein said pair of upwardly facing supporting surfaces of each portable hose reel assembly is provided on a pair of spaced integral projections on the supporting frame and handle structures thereof respectively.*

*46. The combination as defined in claim 45 wherein said pair of downwardly facing stacking surfaces of each portable hose reel assembly is provided by a pair of spaced integral lower portions of the supporting frame structure thereof.*

*47. The combination as defined in claim 46 wherein all of said portable hose reel assemblies in said stack have their circular end flanges in closely spaced substantial vertical alignment.*

*48. The combination as defined in claim 43, wherein each pair of adjacent portable hose reel assemblies in said stack has a total of four spaced pairs of interengaging surfaces constructed and arranged to be positioned in stack supporting relation when said adjacent pair of portable hose reel assemblies are in said stack,*

*two pairs of the interengaging surfaces of each adjacent pair of portable hose reel assemblies in said stack being disposed in stack supporting relation so as to prevent downward movement of a forward portion of the uppermost portable hose reel assembly with respect to the lowermost portable hose reel assembly of each pair,*

*the other two pairs of the interengaging surfaces of each adjacent pair of portable hose reel assemblies in said stack being disposed in stack supporting relation so as to prevent downward movement of a rearward portion of the uppermost portable hose reel assembly with respect to the lowermost portable hose reel assembly of each pair.*

*49. The combination as defined in claim 48 wherein said interengaged surfaces include (1) two pairs of downwardly facing stacking surfaces in which each stacking surface of said two pairs are spaced apart with respect to one another on each portable hose reel assembly and (2) two pairs of upwardly facing supporting surfaces in which each supporting surface of said two pairs are spaced apart with respect to one another on each portable hose reel assembly, the pair of downwardly facing stacking surfaces of an upper portable hose reel assembly of each adjacent pair of portable hose reel assemblies in said stack being interengaged with the pair of upwardly facing surfaces of a lower portable hose reel assembly of said pair.*

* * * * *